(12) United States Patent
Picard et al.

(10) Patent No.: US 12,703,114 B2
(45) Date of Patent: Aug. 11, 2026

(54) MOTION SYSTEM FOR A ROBOT AND ROBOT

(71) Applicant: ABB E-mobility B.V., Delft (NL)

(72) Inventors: Luc Picard, Zaventem (BE); Cristian Alejandro Vergara Perico, Leuven (BE); Juan Cuellar Lopez, Leuven (BE); Nastaran Nourbakhsh Kaashki, Brussels (BE)

(73) Assignee: ABB E-Mobility B.V., Delft (NL)

( * ) Notice: Subject to any disclaimer, the term of this patent is extended or adjusted under 35 U.S.C. 154(b) by 83 days.

(21) Appl. No.: 18/785,361

(22) Filed: Jul. 26, 2024

(65) Prior Publication Data

US 2025/0033229 A1 Jan. 30, 2025

(30) Foreign Application Priority Data

Jul. 28, 2023 (EP) .................................... 23188507

(51) Int. Cl.
*B25J 17/02* (2006.01)
*B25J 9/12* (2006.01)
*B60L 53/35* (2019.01)

(52) U.S. Cl.
CPC ........... *B25J 17/0258* (2013.01); *B25J 9/123* (2013.01); *B60L 53/35* (2019.02)

(58) Field of Classification Search
CPC ......... B60L 53/35; B25J 9/123; B25J 9/0051; B25J 17/0216
See application file for complete search history.

(56) References Cited

U.S. PATENT DOCUMENTS 2,601,927 A 7/1952 Frenzel
4,652,718 A * 3/1987 Fujita .................. B23K 11/067 901/29

(Continued)

FOREIGN PATENT DOCUMENTS

CN 112171643 A 1/2021
CN 114274120 A * 4/2022

(Continued)

OTHER PUBLICATIONS

European Patent Office, Extended European Search Report in European Patent Application No. 23188507.0, 11 pp. (Dec. 13, 2023).

*Primary Examiner* — Gregory Robert Weber
(74) *Attorney, Agent, or Firm* — McCarter & English, LLP; Michael M. Gnibus

(57) ABSTRACT

A motion system includes a linear actuation system having a plurality of actuators of a first-type and at least a first kinematic link connected by an eighth joint to the plurality of first-type actuators; a first subsystem comprising a linear actuation system connected to a fourth kinematic link by a first revolute joint; a second subsystem comprising the first subsystem connected to a ground plate, the linear actuation system connected to the ground plate by a third joint and to a fifth kinematic link by a fourth joint. The second kinematic link is connected to the first subsystem; a wrist element is connectable to at least one tool element, wherein the wrist element is connected to the second subsystem, wherein the wrist element and the second subsystem generate a coordinated movement such that the tool element is movable relative to the ground plate.

8 Claims, 8 Drawing Sheets

(56) References Cited

U.S. PATENT DOCUMENTS

| | | | |
|---|---|---|---|
| 7,331,750 | B2 | 2/2008 | Merz et al. |
| 9,815,377 | B2 * | 11/2017 | Wu ........................ B60L 53/65 |
| 11,077,547 | B2 | 8/2021 | Gosselin |
| 2019/0160653 | A1 | 5/2019 | Artemiadis et al. |
| 2020/0144838 | A1 | 5/2020 | Penilla et al. |
| 2020/0201448 | A1 | 6/2020 | Ore-Yang |
| 2023/0108220 | A1 | 4/2023 | Van Der Weijde et al. |

FOREIGN PATENT DOCUMENTS

| | | | | |
|---|---|---|---|---|
| DE | 102011101206 | A1 * | 11/2012 | .......... B25J 11/0045 |
| WO | WO 2021/151542 | A1 | 8/2021 | |

* cited by examiner

MOTION SYSTEM FOR A ROBOT AND ROBOT

CROSS-REFERENCE TO RELATED APPLICATIONS

The instant application claims priority to European Patent Application No. 23188507.0, filed Jul. 28, 2023, which is incorporated herein in its entirety by reference.

FIELD OF THE DISCLOSURE

The present disclosure relates to a motion system for a robot and to a robot.

BACKGROUND OF THE INVENTION

In prior art, a battery of an electrically driven vehicle needs to be charged with energy. Usually, the vehicle is positioned at a charging station and the vehicle is connected with a plug of the charging station to be charged with energy.

At the moment, the charging process of such a vehicle is at least partly performed manually with the support of a human. However, as more electrically driven vehicles gain ability to drive at least partly in an autonomous way, the existing charging process for such a vehicle is complex and not efficient. A robot for supporting the charging process by automatically charging the vehicle parked at the charging station would simply this entire process. Existing technical solutions in this field suggest the use of autonomous charging robots, for example, described in WO 2021/151542 A1 or in US 2020/144838 A1.

However, such charging robots are bulky and use complex technology, in particular for the charging plug to be connected to the charging inlet of the vehicle to perform an efficient charging process is not time- and cost-efficient. In particular, the existing technology of positioning the charging plug of the charging robot by a robot arm or robot manipulator of the charging robot relative to the charging inlet of the vehicle to be charged is complex thus, the charging process is not efficient.

BRIEF SUMMARY OF THE INVENTION

Therefore, it would be advantageous to provide an improved concept for a motion system for a robot that is easy to produce and maintain and that is easily adaptable for different applications and which can be operated at low-costs.

In a first aspect of the present invention, there is provided a motion system comprising: a linear actuation system comprising a plurality of actuators of a first-type and at least a first kinematic link connected by an eighth joint to the plurality of first-type actuators; a first subsystem comprising at least one linear actuation system connected to at least a fourth kinematic link by at least a first revolute joint and interconnected between them by a second revolute joint; a second subsystem comprising the first subsystem connected to a ground plate, wherein the linear actuation system is connected to the ground plate by a third joint and to a fifth kinematic link by a fourth joint, and wherein the fifth kinematic link is connected to the first subsystem by the second revolute joint; a wrist element connectable to at least one tool element, wherein the wrist element is connected to the second subsystem, wherein the wrist element and the second subsystem are configured to generate a coordinated movement in such a way that the at least one tool element is movable relative to the ground plate.

One important aspect of the motion system is that it is easy to control and that it is a foldable motion system that can be used for example as a robot. As the motion system is foldable due to its kinematic technology, the motion system can be implemented in a robot or robot system or embodied as a robot that does not need much space and thus, is space-saving. This is important for many applications, e.g. when the motion system is used in small places. Using the motion system in or as a charging robot is just one example of an application. The present invention is not restricted to this application, however.

In a detailed and further aspect of the present invention, the motion system may comprise: a linear actuation system comprising a plurality of actuators of a first-type and at least a first kinematic link connected by a eighth joint to the plurality of first-type actuators; a first subsystem comprising at least one linear actuation system connected to at least a fourth kinematic link by at least a first revolute joint and interconnected between them by a second revolute joint; a second subsystem comprising the first subsystem connected to a ground plate by a third revolute joint with its revolute axes aligned, wherein the linear actuation system connected to the ground plate by a third joint and to a fifth kinematic link by a fourth joint, and wherein the fifth kinematic link is connected to the first subsystem by the second revolute joint; a wrist element connected to at least one tool element, wherein the wrist element is connected to the second subsystem by a fifth revolute joint, wherein the wrist element and the second subsystem are configured to generate a coordinated movement in such a way that the at least one tool element is movable relative to the ground plate.

As the motion system uses actuators that are embodied as flexible belts, no metal chains are used and need to be maintained in the motion system. Further, due to its foldable design, the motion system can be easily aligned to changing positions or locations for which the motion is intended to be used. This allows a large flexibility of the motion system for a variety of different applications.

BRIEF DESCRIPTION OF THE SEVERAL VIEWS OF THE DRAWING(S)

FIG. 1*a* is a schematic of an example of a motion system according to an embodiment of the present disclosure.

FIG. 1*b* is a schematic of an example of a wrist element for a motion system according to an embodiment of the present disclosure.

FIG. 1*c* is a schematic and detailed example of a part of an actuator system of a motion system according to an embodiment of the present disclosure.

Figures 7A, 7B:
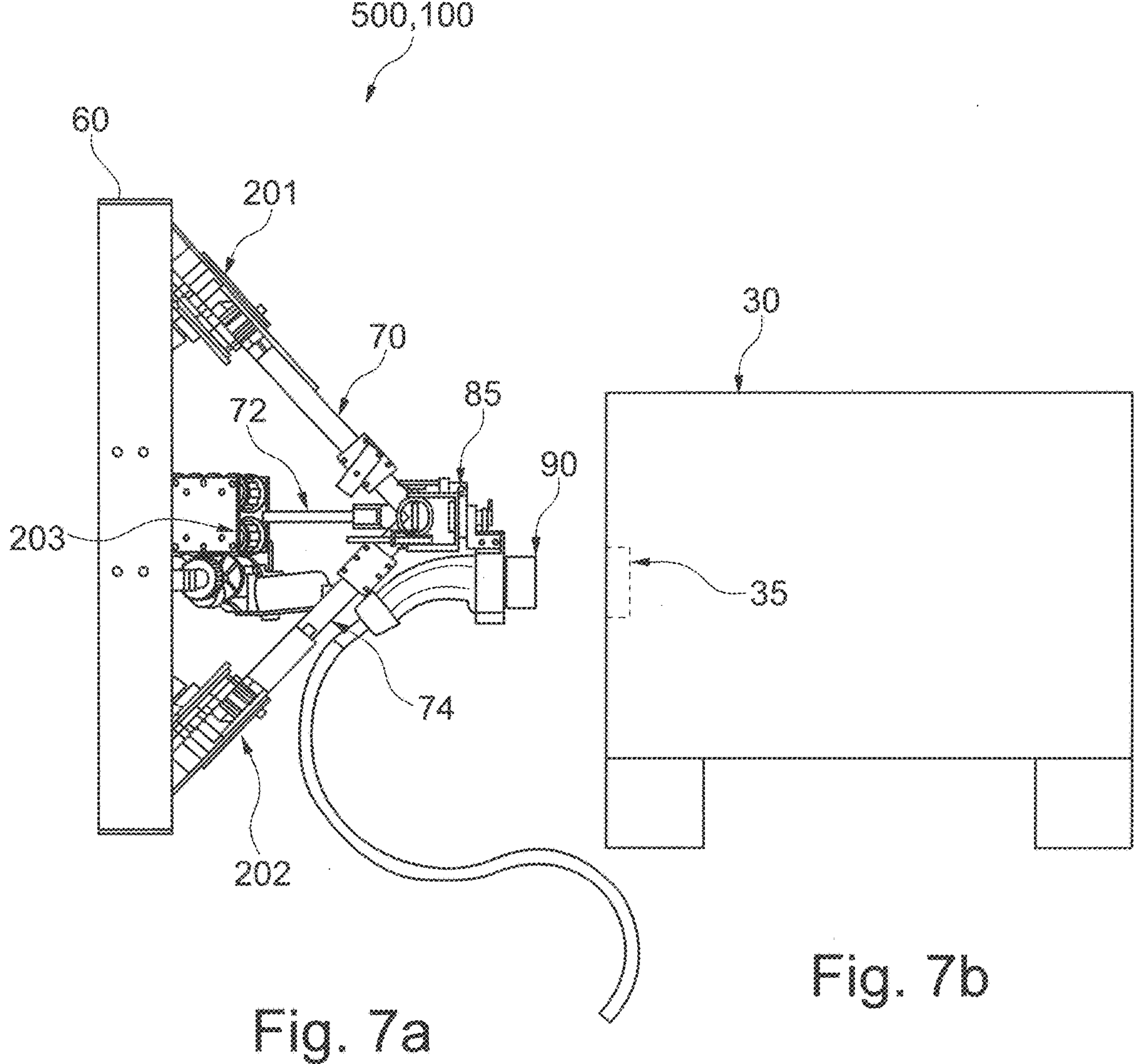

FIGS. 7*a* and 7*b* illustrate a schematic example of a robot system with the motion system according to an embodiment of the present disclosure.

Figure 8:
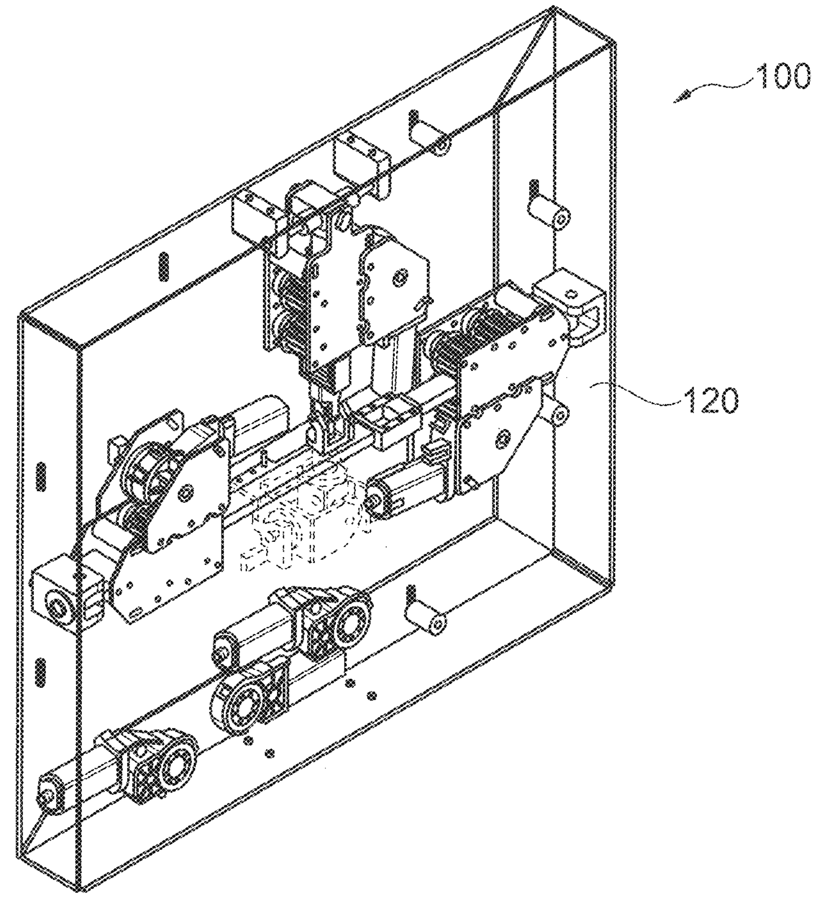

FIG. 8 illustrates a schematic example of the motion system according to an embodiment of the present invention.

DETAILED DESCRIPTION OF THE INVENTION

Figures 1A, 1B, 1C:
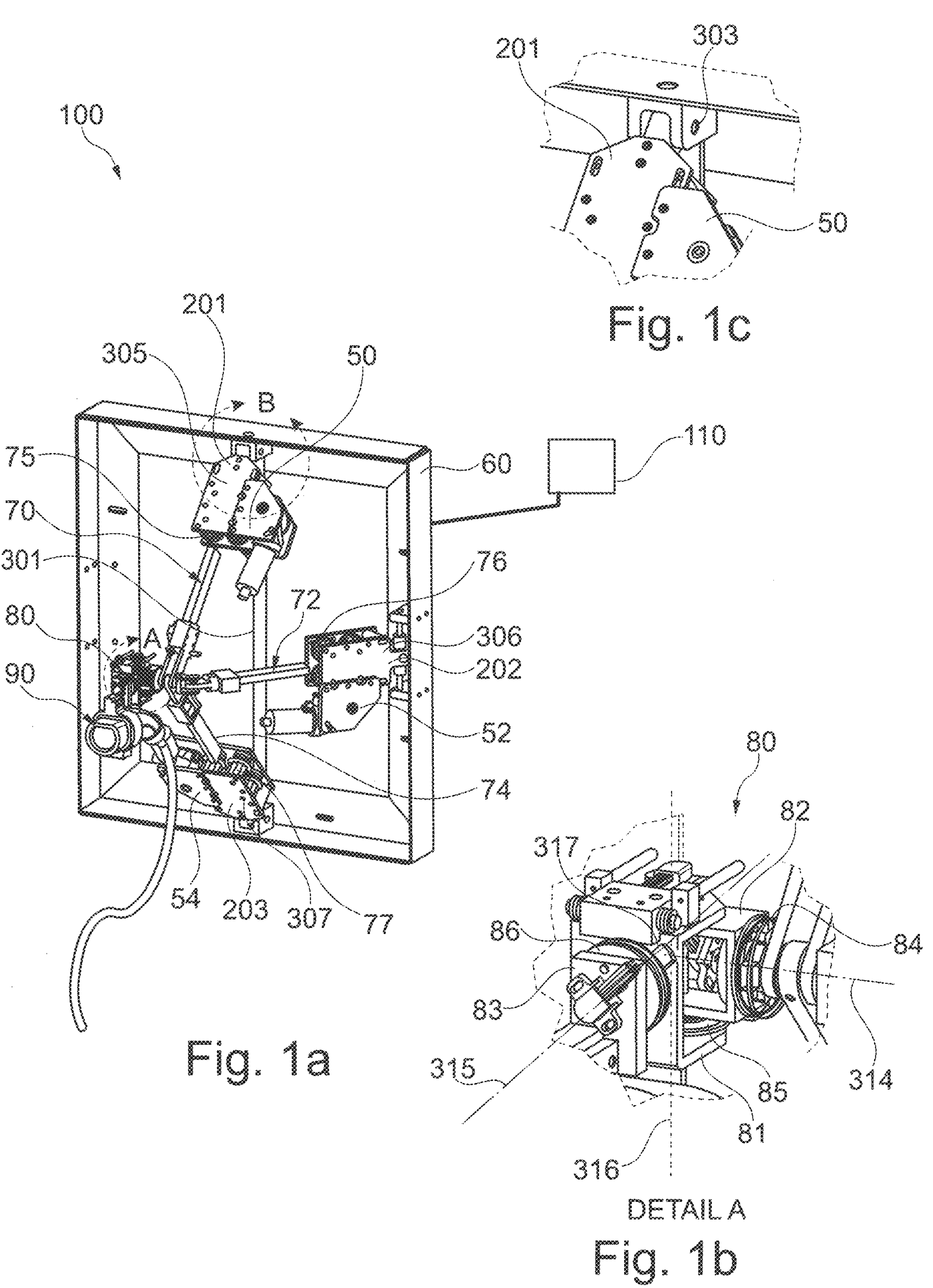

FIG. 1*a* illustrates a schematic example of a motion system 100 according to an embodiment of the present invention. The motion system 100 comprises of different components: a linear actuation system 201, 202, 203 (see also FIG. 2 for details), a first system 300 (see also FIG. 3 for further details), a second subsystem 400 (see also FIG. 4 for further details) and a wrist element 80 (see also FIG. 1-1 for further details).

The linear actuation system 201, 202, 203 of the motion system 100 comprises a plurality of actuators of a first-type 50, 52, 54 and at least a first kinematic link 70, 72, 74 connected by a prismatic eighth joint 305, 306, 307 to the plurality of first-type actuators 50, 52, 54. The term prismatic means that the joint is able to slide along its axis and that the prismatic joint is configured as a linear actuator.

The first subsystem 300 of the motion system 100 comprises at least one linear actuation system 201, 203 connected to at least a fourth kinematic link 301 by at least a first revolute joint 303, 304 and interconnected between them by a second revolute joint 308.

The second subsystem 400 of the motion system 100 comprises the first subsystem 300 connected to a ground plate 60 by a third revolute joint 310, 311 with its revolute axes 312, 313 aligned, wherein the linear actuation system 202 connected to the ground plate 60 by a third joint 401 and to a fifth kinematic link 402 by a fourth joint 403, and wherein the fifth kinematic link 402 is connected to the first subsystem 300 by the second revolute joint 308.

The wrist element 80 is connectable or connected to at least one tool element 90, wherein the wrist element 80 is connected to the second subsystem 400 by a fifth revolute joint 84, wherein the wrist element 80 and the second subsystem 400 are configured to generate a coordinated movement in such a way that the at least one tool element 90 is movable relative to the ground plate 60.

In an embodiment of the disclosure, the wrist element 80 and the second subsystem 400 are configured to generate a coordinated movement in such a way that the at least one tool element 90 is movable within at least three degrees of freedom relative to the ground plate 60.

In an embodiment of the disclosure, there could be also six degrees of freedom.

Further, the motion system 100 is controlled by a controller unit 110, as shown in FIG. 1*a*.

The controller unit 110 is configured to communicate with the plurality of actuators 50, 52, and 54, of the first-type. The controller unit 110 is further configured to independently drive each of the plurality of kinematic link elements 70, 72, 74 to change a length, and/or speed of the leg elements 70, 72, 74 generating a first-type of movement. The first-type of movement comprises at least one of a change of x-y-z position and/or a velocity, a change of orientation of the first subsystem 300, measured around by the third revolute joint 310 (see for example FIG. 3).

Figure 4:
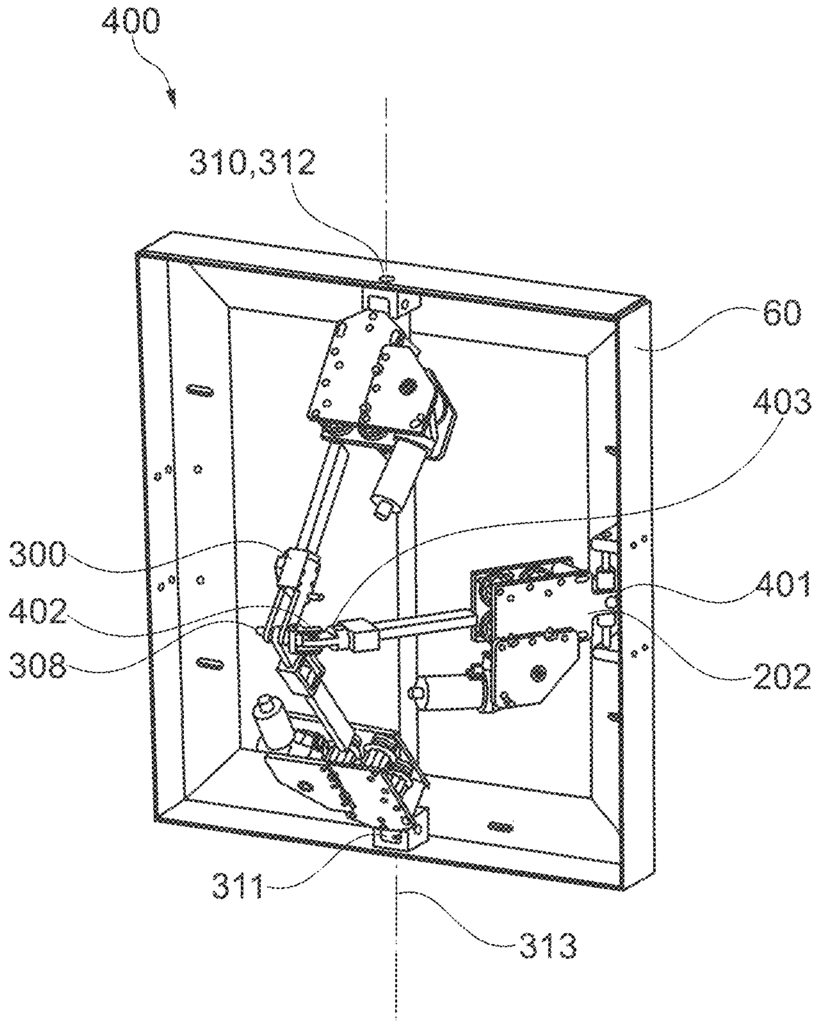
FIG. 4 illustrates a schematic example of a subsystem of the motion system (Parallel robot) according to an embodiment of the present disclosure.
Figure 5:
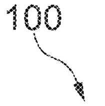
FIG. 5 illustrates a schematic example of the motion system according to an embodiment of the present disclosure.
Figure 5:
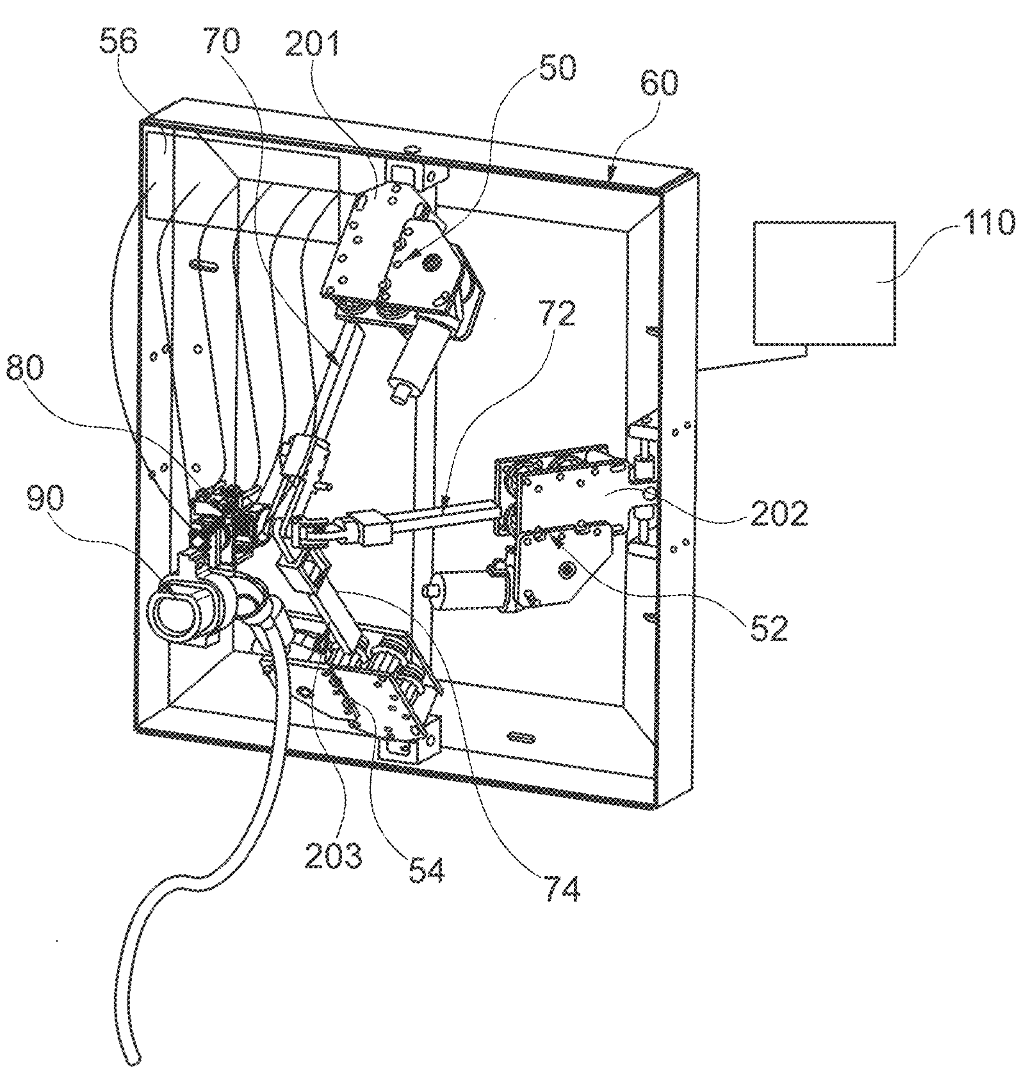

As shown in FIG. 5, the controller unit 110 is further configured to communicate with at least one actuator of a second-type 56 to generate a second-type of movement. The second-type of movement comprises at least one of a change of orientation, a position and/or a velocity of the third kinematic link 83 measured with respect to the position of the second joint 308 (see FIG. 4) and orientation of the first subsystem 300.

The movement of the tool element 90 to a defined position by the motion system 100 may be executed in the following fashion. A coordinated drive of the second subsystem 400 and the wrist element 80 is composed of the first generated type of movement and the second generated type of movement is configured to drive the controllable motion system 100 towards a storing configuration, in which the plurality of actuators of the first-type 50, 52, 54, the wrist element 80 and the tool element 90 (see FIG. 1) are aligned and fitted in a box with a size along the normal direction of the base ground 60. An example for such a box 120 is depicted in FIG. 8. The dimension or thickness of such a box 120 is about or less than 150 mm and is just an example. Other dimensions of such a box 120 are possible and are dependent on the application.

Further, a coordinated drive of the second subsystem 400 and the wrist element 80 is composed of the first generated type of movement and the second generated type of movement moves the tool element 90 from the storing configuration to a distance longer than the size along the normal direction of the base ground 60.

In this respect, it should be further mentioned that a use of a sensing device, e.g. camera, LIDAR, laser, and a perception methodology to correct and drive the coordinated motion of the linear actuation systems of first and second type to drive the tool (e.g. plug) towards a desired target. In this way, loose tolerances are allowed that can significantly decrease the cost of the motion system.

FIG. 1*b* illustrates a schematic example of a wrist element 80 for the motion system 100 according to an embodiment of the present invention. The wrist element 80 of FIG. 1*b* shows a section A of FIG. 1*a* in detail. The wrist element 80. The wrist element 80 comprises a first kinematic link 81 that is connected to a second kinematic link 82 by a sixth revolute joint 85. A third kinematic link 83 is connected to the first kinematic link 82 by a seventh revolute joint 86, wherein the axes 314, 315, 317 of the revolute joints 84, 85, 86 intersect at a center 317 of the wrist element 80, as shown in detail in FIG. 1*b*. The axe 314 is an x-axis, the axis 316 is the z-axis of the wrist element 80.

FIG. 1*c* illustrates a schematic and detailed example of a part of an actuator system 201 of a motion system 100 according to an embodiment of the present disclosure. FIG. 1*c* shows a linear actuator system 201 comprising a corresponding first actuator of a first-type 50. The linear actuator system 201 is mounted or installed using a first revolute joint 303 at the ground plate 60. Correspondingly, the two other linear actuator systems 202, 203 are constructed in the same manner. The linear actuator system 202 with a second actuator of first type 52 and the linear actuator system 203 with a third actuator of first type 54 are mounted in an equivalent manner at the ground plate 60, as shown in FIG. 1*a* for example.

Figure 2:
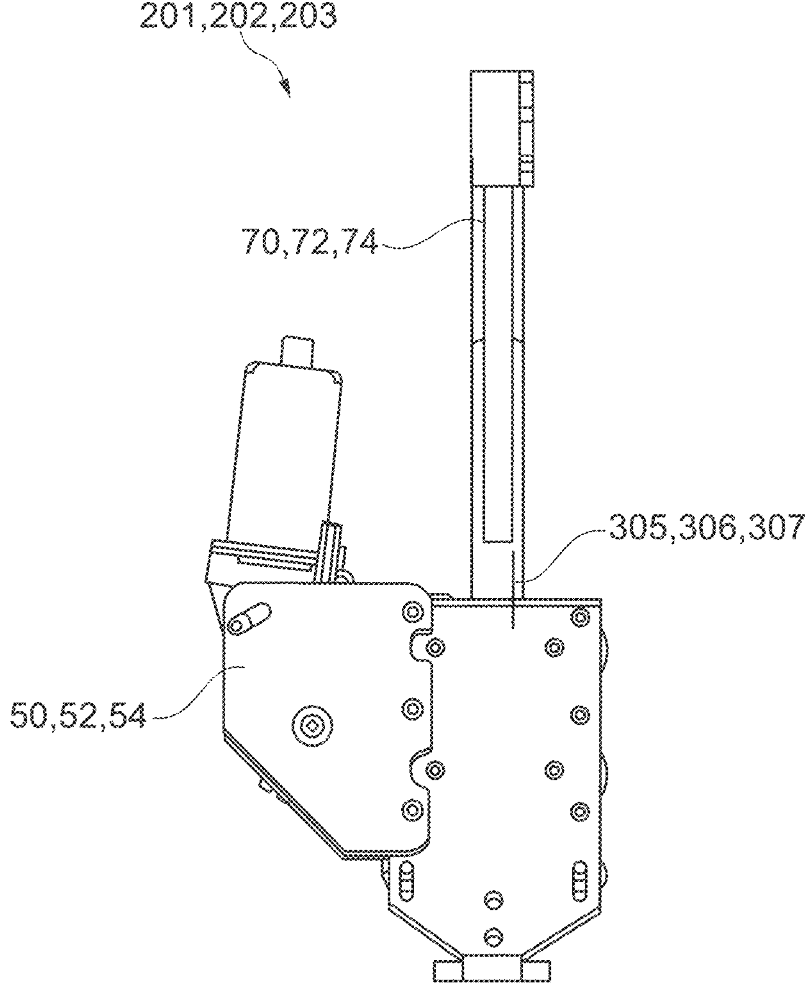
FIG. 2 illustrates a schematic example of an actuation system of the motion system according to an embodiment of the present disclosure.

FIG. 2 illustrates a schematic example of a linear actuation system 201, 202, 203 of the motion system 100 according to an embodiment of the present invention. The FIG. 2 shows a part of the linear actuation system 201, 202, 203 in detail manner as depicted in FIG. 1. Each of the linear actuation systems 201, 202, 203 comprises a prismatic eighth joint 305, 306, and 307, which is connected to a corresponding kinematic link 70, 72, 74. Further, each of the linear actuation systems 201, 202, 203 comprises an actuator of a first type 50, 52, 54.

Figure 3:
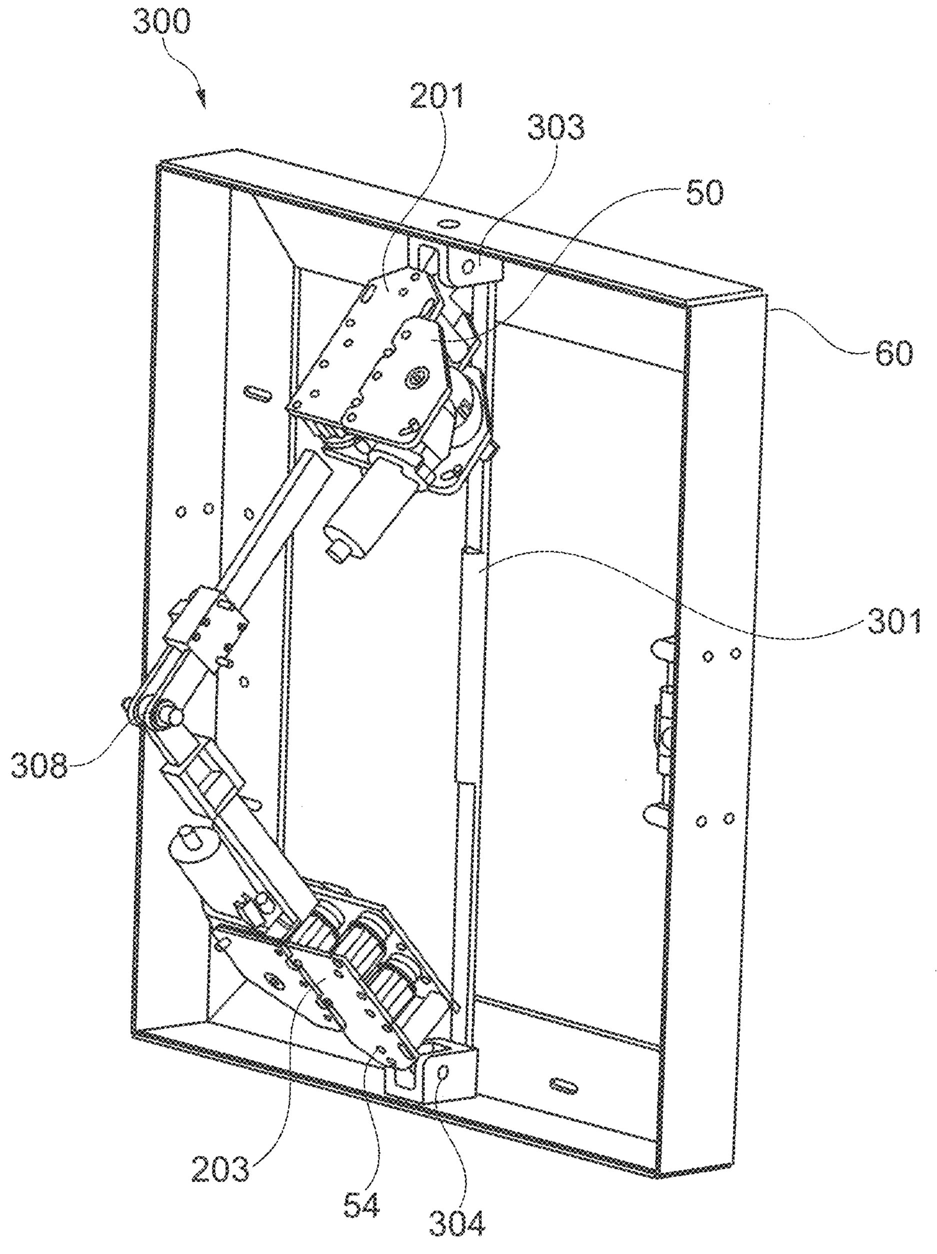
FIG. 3 illustrates a schematic example of a subsystem of the motion system (Triangle) according to an embodiment of the present disclosure.

FIG. 3 illustrates a schematic example of a first subsystem 300 of the motion system (Triangle) according to an embodiment of the present invention. The subsystem 300 comprising at least one linear actuation system 201, 203 connected to at least a fourth kinematic link 301 by first revolute joints 303, 304. The linear actuation systems 201, 203 are by a second revolute joint 308. In this way, the subsystem 300 forms a triangle.

FIG. 4 illustrates a schematic example of a second subsystem 400 of the motion system 100 (Parallel robot) according to an embodiment of the present invention.

The second subsystem 400 comprises the first subsystem 300 (sec. FIG. 3) connected to the ground plate 60 by a third revolute joint 310, 311 with its revolute axes 312, 313 aligned. The revolute axis 312, 313 are vertical axis. The additional third linear actuation system 202 is connected to the ground plate 60 by a third universal joint 401 and to a fifth kinematic link 402 by a (universal) fourth joint 403. The fifth kinematic link 402 is connected to the first subsystem 300 by the second revolute joint 308.

FIG. 5 illustrates a schematic example of the motion system 100 according to an embodiment of the present invention. The difference of the embodiment of the motion system 100 shown in FIG. 1 is that the revolute joints 84, 85, and 86, are driven by an actuator of a second type 56. The actuator of the second type 56 is configured as a Bowden-based actuator. The motion system 100 may comprise a plurality of second-type actuators 56.

Figure 6:
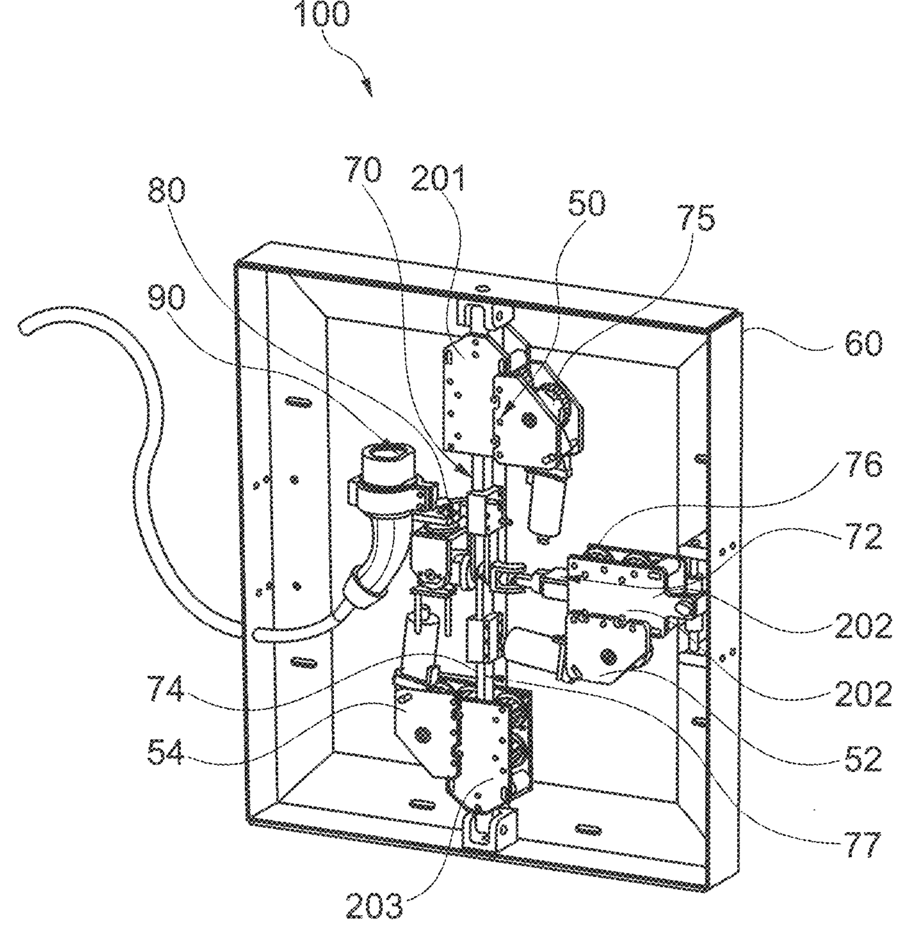
FIG. 6 illustrates a schematic example of the motion system according to an embodiment of the present disclosure.

FIG. 6 illustrates a schematic example of the motion system 100 according to an embodiment of the present invention. Compared to the motion system 100 as shown in FIG. 1, the motion system 100 in FIG. 6 is in a folded position. The FIGS. 1, 3, 4, 5 and 7 each show a motion system 100 in an unfolded position.

FIGS. 7*a* and 7*b* illustrate a schematic example of a robot system 500 with the motion system 100 according to an embodiment of the present invention. The robot or robot system 500 with the motion system 100 comprises a tool element 90 that is embodied as a plug. The plug is inserted in the inlet 35 of a vehicle 30. In this example scenario of an application of the robot system 500 with the motion system 100, the motion system 100 is used for positioning the plug in an aligned position in respect to the inlet element 35 in order to connect the plug 90 with the inlet element 35 for charging the vehicle 30. The motion system 100 is responsible for the movement or in other words, the correct positioning of the plug 90 in front of the inlet element 35 of the vehicle 30.

A further advantage of the motion system is that it can be produced and operated at low costs and it is easily adaptable to different technical fields of application belt winding system can be easily adapted to different fields of applications.

According to an example, the wrist element comprising a first kinematic link that is connected to a second kinematic link by a sixth revolute joint, a third kinematic link connected to the first kinematic link by a seventh revolute joint, wherein the axes of the revolute joints intersect at a center of the wrist element. In this way, the motion system provides a flexible functionality that is easy to maintain.

According to an example, the revolute joints are driven by at least one actuator of a second type. In this way, the motion system is flexible and easy to handle.

According to an example, the at least one actuator of the second type is configured as a Bowden-based actuator. In this way, the motion system is flexible, accurate and can be operated cost-efficient.

According to an example, the motion system comprising at least one controller unit configured to communicate with the plurality of actuators of the first-type and is configured to independently drive each of the plurality of kinematic link elements to change a length, and/or speed of the leg elements generating a first-type of movement, wherein this first-type of movement comprises at least one of a change of x-y-z position and/or a velocity, a change of orientation of the first subsystem, measured around by the third revolute joint. In this way, the motion system can be controlled in an easy manner and is easily adaptable to different applications.

According to an example, the at least one controller unit is further configured to communicate with at least one actuator of a second-type to generate a second-type of movement, wherein this second-type of movement comprises at least one of a change of orientation, a position and/or a velocity of the third kinematic link measured with respect to the position of the second joint and orientation of the first subsystem. In this way, the motion system can be brought in any preferable position in an easy manner.

According to an example, a coordinated drive of the second subsystem and the wrist element is composed of the first generated type of movement and the second generated type of movement is configured to drive the controllable motion system towards a storing configuration, in which the plurality of actuators of the first-type, the wrist element and the tool element are aligned and fitted in a box with a size along the normal direction of the base ground. In this manner, the motion system can be operated in an efficient manner.

According to an example, a coordinated drive of the second subsystem and the wrist element is composed of the first generated type of movement and the second generated type of movement moves the tool element from the storing configuration to a distance longer than the size along the normal direction of the base ground. In this manner, the motion system is operated in an efficient manner.

In a second aspect of the disclosure, a robot system is provided comprising a motion system according to the first aspect.

In a third aspect of the invention, the motion system is used as part of a robot system for charging a vehicle.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE SIGNS

30 Vehicle
35 Inlet element
50, 52, 54 First-type actuator
56 Second-type actuator/Bowden-Actuator
60 Ground plate
70, 72, 74 First kinematic link
75, 76, 77 Belt element
80 Wrist element
81 First kinematic link
82 Second kinematic link
83 Third kinematic link
84 Fifth revolute joint
85 Sixth revolute joint
86 Seventh revolute joint
90 Tool element
100 Motion system
110 Controller unit
120 Box
201, 202, 203 Linear actuation system
300 First subsystem
301 Fourth kinematic link
303, 304 First revolute joint
308 Second revolute joint
305, 306, 307 Eighth Joint
310, 311 Third revolute joint
312, 313 Revolute axe
314, 315, 316 Revolute axe
317 Center of the wrist element
400 Second subsystem
401 Third joint
402 Fifth kinematic link
403 Fourth joint
500 Robot system

What is claimed is:

1. A motion system, comprising:

a plurality of linear actuation systems, wherein each of the plurality of linear actuation systems comprises a first-type actuator and a first kinematic link, wherein the first kinematic link is connected to the first-type actuator by an eighth joint;

a first subsystem comprising at least two of the plurality of linear actuation systems, wherein each of the at least two of the plurality of linear actuation systems is connected to a fourth kinematic link by a first revolute joint, and the at least two of the plurality of linear actuation systems are interconnected by a second revolute joint;

a second subsystem comprising the first subsystem connected to a ground plate and another one of the plurality of linear actuation systems, wherein the another one of the plurality of linear actuation systems is connected to the ground plate by a third joint and is connected to a fifth kinematic link by a fourth joint, and wherein the fifth kinematic link is connected to the first subsystem;

a wrist element that is configured to be connectable to at least one tool element, wherein the wrist element is connected to the second subsystem, wherein the wrist element and the second subsystem are configured to generate a coordinated movement in such a way that the at least one tool element is movable relative to the ground plate.

2. The motion system according to claim 1, wherein the wrist element comprises a first wrist element kinematic link that is connected to a second wrist element kinematic link by a sixth revolute joint, a third wrist element kinematic link connected to the first wrist element kinematic link by a seventh revolute joint, wherein the axes of the sixth revolute joint and the seventh revolute joint intersect at a center of the wrist element.

3. The motion system according to claim 2, wherein the sixth revolute joint and the seventh revolute joint are driven by at least one second-type actuator.

4. The motion system according to claim 3, wherein the at least one second-type actuator is configured as a Bowden-based actuator.

5. The motion system according to claim 4, further comprising at least one controller unit configured to communicate with the at least one second-type actuator to generate a second-type of movement, wherein the second-type of movement comprises at least one of a change of orientation, a change of position, or a change of velocity of the third wrist element kinematic link measured with respect to a position of a second joint and orientation of the first subsystem.

6. The motion system according to claim 5, wherein a coordinated drive of the second subsystem and the wrist element is composed of a first-type of movement and the second-type of movement, and the coordinated drive is configured to drive the controllable motion system towards a storing configuration, in which a plurality of the first-type actuators, the wrist element and the at least one tool element are aligned and fitted in a box with a size along a normal direction of a base ground.

7. The motion system according to claim 5, wherein a coordinated drive of the second subsystem and the wrist element is composed of a first-type of movement and the second-type of movement, wherein the coordinated drive is configured to move the at least one tool element from a storing configuration to a distance longer than a size along a normal direction of a base ground.

8. The motion system according to claim 1, further comprising at least one controller unit configured to communicate with the plurality of first-type actuators and is configured to independently drive each of the first kinematic link elements to change a length, and/or speed of leg elements generating a first-type of movement, wherein the first-type of movement comprises at least one of a change of x-y-z position and/or a change of orientation of the first subsystem, measured with respect to a position of a third revolute joint.

* * * * *